United States Patent
Snell et al.

[11] Patent Number: 6,141,534
[45] Date of Patent: Oct. 31, 2000

[54] COMMUNICATION SATELLITE SYSTEM WITH DYNAMIC DOWNLINK RESOURCE ALLOCATION

[75] Inventors: William L. Snell, Monmouth; Mark D. Thompson, Hood River, both of Oreg.

[73] Assignee: Spacecode LLC, Monmouth, Oreg.

[21] Appl. No.: 09/047,981

[22] Filed: Mar. 25, 1998

[51] Int. Cl.[7] .................................................. H04B 7/185
[52] U.S. Cl. ...................... 455/12.1; 455/10; 455/13.4; 455/452
[58] Field of Search .................... 455/12.1, 450, 455/452, 453, 455, 69, 522, 10, 13.2, 13.4, 3.2, 62, 505; 343/881

[56] References Cited

U.S. PATENT DOCUMENTS

| | | | |
|---|---|---|---|
| 3,676,778 | 7/1972 | Mori .................................... | 455/12.1 |
| 4,004,224 | 1/1977 | Arens et al. ........................... | 455/6 |
| 4,228,538 | 10/1980 | Scharla-Nielsen et al. ........... | 455/13.4 |
| 4,309,764 | 1/1982 | Acampora ............................. | 455/13.2 |
| 4,715,029 | 12/1987 | Crookshanks ......................... | 370/70 |
| 4,752,967 | 6/1988 | Bustamante et al. ................. | 455/12.1 |
| 4,831,619 | 5/1989 | Rosen ................................... | 370/75 |
| 4,896,369 | 1/1990 | Adams, Jr. et al. ................... | 455/505 |
| 4,941,199 | 7/1990 | Saam .................................... | 455/10 |
| 5,060,292 | 10/1991 | Ayukawa et al. ..................... | 455/13.4 |
| 5,128,965 | 7/1992 | Henriksson .......................... | 455/69 |
| 5,448,621 | 9/1995 | Knudsen ............................... | 455/12.1 |
| 5,475,520 | 12/1995 | Wissinger ............................. | 359/172 |
| 5,491,837 | 2/1996 | Haartsen .............................. | 455/62 |
| 5,589,834 | 12/1996 | Weinberg ............................. | 342/354 |
| 5,590,395 | 12/1996 | Diekelman ........................... | 455/13.4 |
| 5,612,701 | 3/1997 | Diekelman ........................... | 455/12.1 |
| 5,642,122 | 6/1997 | Lockie et al. ........................ | 343/881 |
| 5,669,062 | 9/1997 | Olds et al. ............................ | 455/12.1 |
| 5,754,942 | 5/1998 | Wachs .................................. | 455/13.4 |
| 5,797,082 | 8/1998 | Lusignan ............................. | 455/3.2 |

*Primary Examiner*—Dwayne D. Bost
*Assistant Examiner*—Quochien B. Vuong
*Attorney, Agent, or Firm*—Ipsolon LLP

[57] ABSTRACT

A communication satellite system dynamically allocates additional downlink resources on the satellite to selected downlink signals to compensate for signal degradation. A typical cause of such degradation is rain where the downlink station is located. Another cause of such degradation is increased communication traffic or bandwidth demand within a particular region.

31 Claims, 10 Drawing Sheets

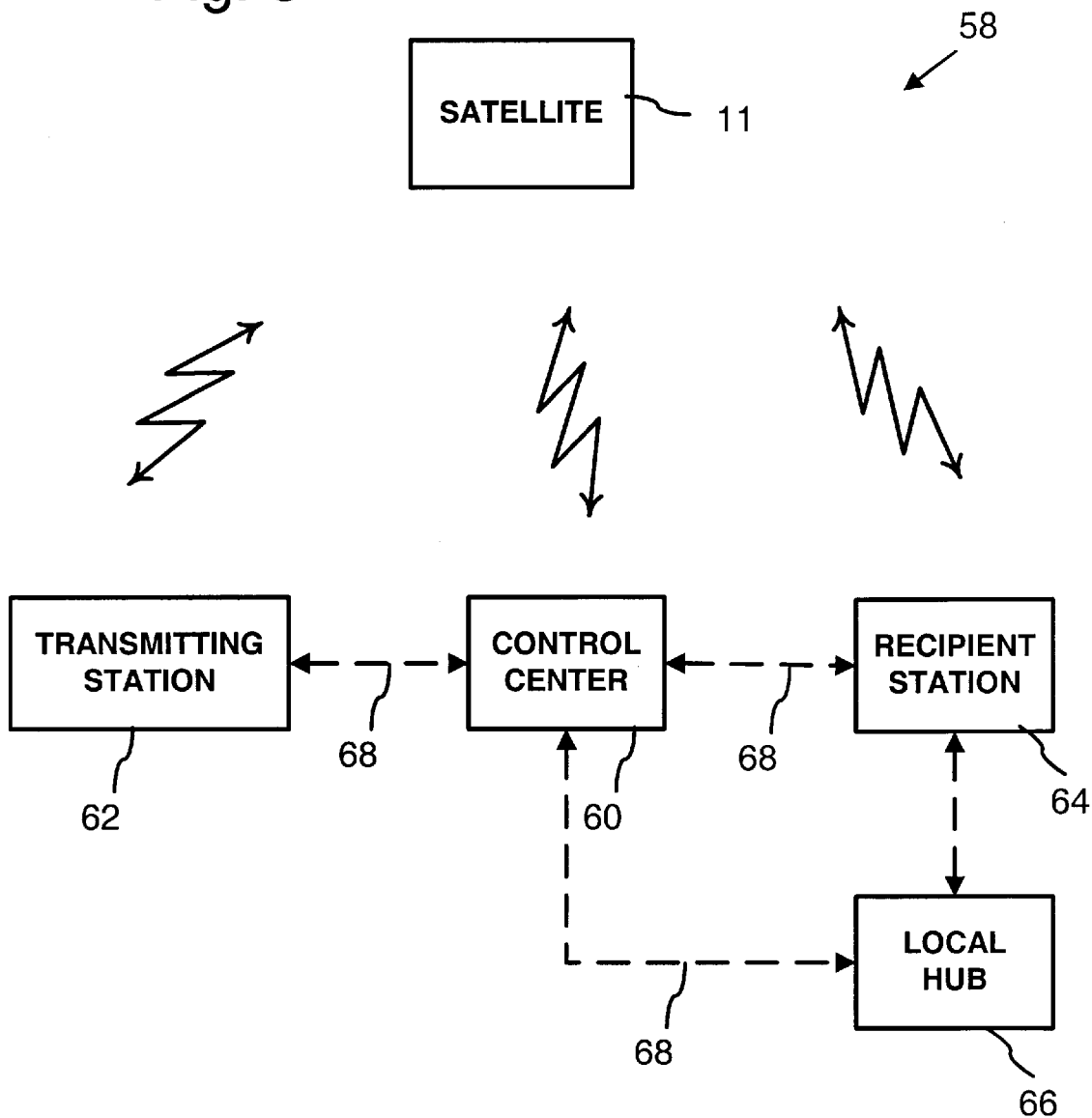

COMMUNICATION SATELLITE SYSTEM WITH DYNAMIC DOWNLINK RESOURCE ALLOCATION

FIELD OF THE INVENTION

The present invention relates to satellite downlink communications and, in particular, to dynamically varying downlink resources between regions according to localized downlink signal degradation.

BACKGROUND AND SUMMARY OF THE INVENTION

Communication satellite systems have limited bandwidth and power for transmitting downlink communication signals. The amount of effective bandwidth in a communication satellite system directly corresponds to the amount of traffic that can be carried (i.e., the satellite's capacity). Typically, satellite downlink communications are transmitted over a wide area, which may be covered by an array of narrow zone beams or cells to make maximal use of the physical or actual bandwidth that is allocated. This allows the frequency band of the actual bandwidth to be used multiple times and thereby increase the effective bandwidth for satellite communications. Each spot beam is associated with one or more transponders, each of which has its own power requirements. The power requirements of these transponders must be met with the limited power resources of a communication satellite.

One signal degradation problem facing satellite communications, particularly at Ku-band (11–12 GHz) and higher frequency communications, is degradation of the communication signals by weather conditions such as rain. Rain can cause downlink signal attenuation of as much as 20 dB (the higher the rain rate the greater the degradation of the signal from a satellite to a ground recipient). Such extreme attenuation can dramatically degrade recipient signal detection and therefore system availability and capacity. In some places, particularly places with generally equatorial climates, prolonged heavy rains can cause unacceptably prolonged attenuation of satellite downlink communications.

Another communication signal degradation effect is caused by increased signal traffic. When the traffic within a saturated transponder increases (i.e., more signals are added), the power available per signal decreases. Similarly, when traffic takes up more of the available bandwidth of the transponder due to having more signals or signals increasing their bandwidth, the power available per unit bandwidth (i.e., power flux density) decreases. Even with a backed-off or non-saturated transponder, new signals or bandwidth requirement can degrade all signals under some circumstances. The end result is that the recipient's signal detection is degraded or there is a decrease in signal availability.

One way to address such communication signal degradation is to provide a fixed increase in the satellite downlink transmission power for all transponders. There are several problems with this brute force solution. The first is that satellite designs are power limited (e.g., 15–20 kW total power), so power increases might only be limited. Another problem is that such a brute force solution is wasteful. With even prolonged daily peaks in signal traffic load or the prolonged rain seasons of a generally equatorial climate, there are significant amounts of time that do not suffer from these degradation effects. As a consequence, fixed power capabilities for solving these signal degradations are frequently wasted (e.g., during relatively dry periods or periods of low traffic demand).

A variation of the brute force solution is to provide a fixed increase in the satellite downlink transmission power only for transponders corresponding to selected places that suffer from such downlink communication signal degradation. For example, the selected places could correspond to the most densely populated areas to which the satellite transmits. A disadvantage is that this solution also permanently diverts power from other transponders, which power could otherwise be used for periods of high demand and heavy rain. This is a significant problem because, for example, the rain patterns that affect densely populated areas also affect other regions. Relegating these other regions to substandard satellite communication service is a generally unacceptable solution.

U.S. Pat. No. 4,831,619 describes a satellite communication system that provides point-to-point communication by interconnecting multiple terminal sites within an area on the earth. Multiple radio frequency uplink communication signals, each carrying a receive signal, are transmitted from uplink terminal sites in the area to a satellite in geosynchronous orbit above the earth. The uplink signals are received at the satellite and are converted to corresponding transmit signals for transmission to downlink terminal sites in the area.

All of the transmit signals are collectively amplified using an interconnected array of amplifiers on the satellite such that each of the transmit signals is amplified collectively by all of the amplifiers. The satellite transmits multiple downlink signals, wherein each of the downlink signals is directed to a downlink terminal site in a particular portion of the area.

The satellite system of U.S. Pat. No. 4,831,619 provides increased power to downlink signals by increasing the power in corresponding uplink signals. The satellite system operates in conjunction with a ground based network control center that keeps track of all regions in which it is raining. The network control center correlates the downlink regions where it is raining with the corresponding uplink users and instructs each of these uplink users to increase its uplink power for the signals destined for a rain-affected area. The increase in power of the uplink users signals results in greater collective amplification of those signals by the satellite amplifiers.

The satellite system of U.S. Pat. No. 4,831,619 addresses attenuation caused by rain with a ground-based solution that utilizes ground-based increases in communication signal power. While this solution may have applicability to point-to-point communications in which uplink stations are capable of increasing their transmission power, such a solution is poorly suited to broadcast communications in which signals are broadcast over a wide area and to point-to-point communications in which uplink power is limited or fixed. This solution is ill-suited to broadcast communications because they do not have a particular uplink transmitter that is directly associated with a corresponding rain-attenuated downlink receiver. The solution provided for point to point communication described in U.S. Pat. No. 4,831,619 is therefore inapplicable to many communication satellite applications.

The present invention overcomes the deficiencies of prior systems by providing a satellite communications system that dynamically allocates additional downlink resources to selected downlink communication signals to compensate for signal degradation. A typical cause of such degradation is rain where the downlink station is located. Another cause of such degradation is increased communication traffic or bandwidth demand within a particular region.

Dynamic allocation of downlink resources provides increased effective capacity and availability without requiring an increase in the fixed downlink resources on a satellite. Resources are allocated to where they are needed, when they are needed, without having to permanently increase the satellite payload as in the brute force methods. The invention can increase the availability of communication signals even if the transmitting user's uplink power is limited. Also, the invention is applicable to broadcast communications in addition to point-to-point communications.

When all communication signals are transmitted into a region without localized degradation, the signals receive standard amplification to provide good signal strength to all downlink sites. In one embodiment, when degradation is detected at a particular downlink region, the amplification of the signal directed to that region may be increased on the satellite to compensate for the effects of degradation. In this manner, power is allocated efficiently, and downlink signal strength is maintained at strength levels to assure reception.

In one embodiment of signal degradation detection, earth based sensors detect conditions likely to degrade downlink signals (e.g., rainfall at ground downlink stations or increased traffic load). Information about these conditions is conveyed to a ground-based control center, such as by a telephone transmission, where the information is processed to determine if downlink signal resources are to be re-allocated. If the downlink signal resources are to be re-allocated, an appropriate control signal is transmitted to the satellite.

The satellite receives information of the signal degradation and dynamically boosts a signal or signals by increasing amplifier power for the selected signal or signals. The satellite may allocate power among the amplifiers to decrease power to signals corresponding to areas with no signal degradation and increase power to signals corresponding to areas with signal degradation without increasing the total power requirement of the communications system. In another embodiment, a user's signal code rate may be changed in response to information of signal degradation conditions. Another methods of compensating for signal degradation include frequency assignment variation and changing the downlink antenna coverage area.

Additional objects and advantages of the present invention will be apparent from the detailed description of the preferred embodiment thereof, which proceeds with reference to the accompanying drawings.

BRIEF DESCRIPTION OF THE DRAWINGS

FIG. 3 is a block diagram illustrating a satellite communication system with a satellite in communication with exemplary ground-based stations.

DETAILED DESCRIPTION OF PREFERRED EMBODIMENTS

Figure 1:
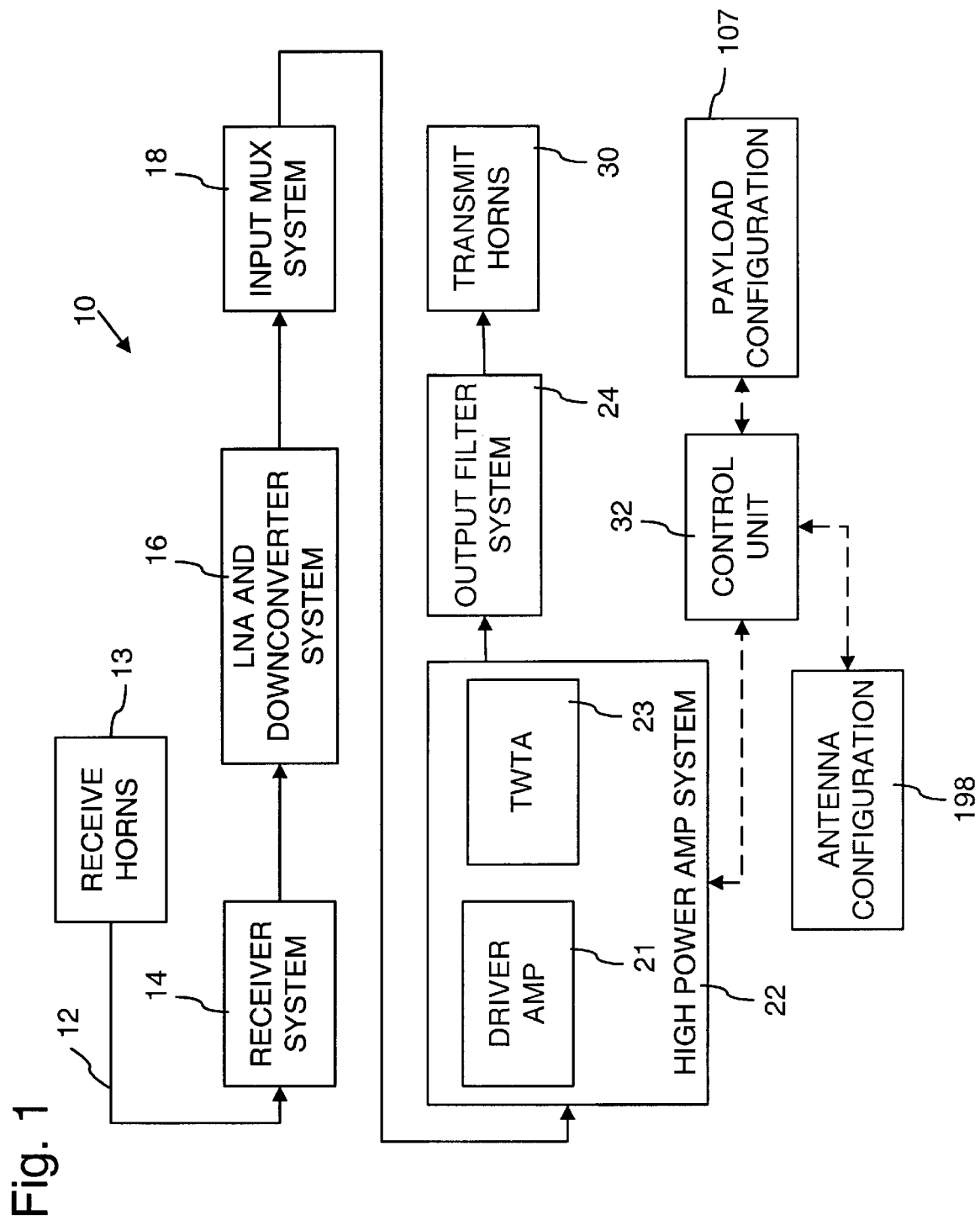
FIG. 1 is a block diagram of a communication satellite system utilizing dynamic downlink resource allocation according to the present invention.

FIG. 1 is a block diagram of an exemplary communication satellite system 10 utilizing dynamic downlink resource allocation according to the present invention. Satellite system 10 is incorporated within a satellite 11 (FIG. 3) in an earth orbit (e.g., geosynchronous) to receive uplink signals from an earth-based or terrestrial transmission station and to transmit corresponding downlink signals to terrestrial reception or receiving stations. The uplink and downlink signals may represent, for example, telecommunication signals or video or data broadcast signals (i.e., communication signals). The satellite includes power sources, orientation and position control systems, communication control systems, etc. as are known in the art.

A communication uplink signal obtained from a satellite receiving antenna or horn 13 is received at an input 12 of an appropriate satellite receiver system 14 that includes multiple individual receivers for receiving multiple signals or transponders of uplink communication signal. The uplink signal may be a Ku-band signal of about 14 GHz, for example. Receiver system 14, as well as other systems within system 10 that are described below, would typically include more individual receivers than the number of signals or channels to be handled by system 10. The additional receivers, or other components, provide redundancy and may be utilized upon the failure of any individual component. Such redundancy is typically utilized in satellite design.

Accordingly, receiver system 14 includes switching arrays to route each channel of the uplink signal to the corresponding active receiver and then to route the signal to a corresponding amplifier/converter in a low noise amplifier (LNA) and downconverter system 16. In this illustrative embodiment, LNA and downconverter system 16 provides pre-amplification of the uplink communication signals and converts them to a lower Ku-band frequency (e.g., 11–12 GHz).

An input multiplexer system 18 receives the low noise amplified and frequency converted uplink signals and channelizes and routes the signals to appropriate ones of redundant high power amplifiers in a high power amplifier system 22. Amplifier system 22 may employ, for example, driver amplifiers 21 with associated traveling wave tube amplifiers 23. Driver amplifiers 21 have two modes of operation: automatic gain and ground commandable gain. Traveling wave tube amplifiers 23 provide high reliability, high power output amplification. The outputs of high power amplifier system 18 are connected through an output filter system 24 to one or more transmit horns 30 for transmission as a downlink signal. A control unit 32 is bus connected to various ones of these components to control their operation and interaction.

Figure 2:
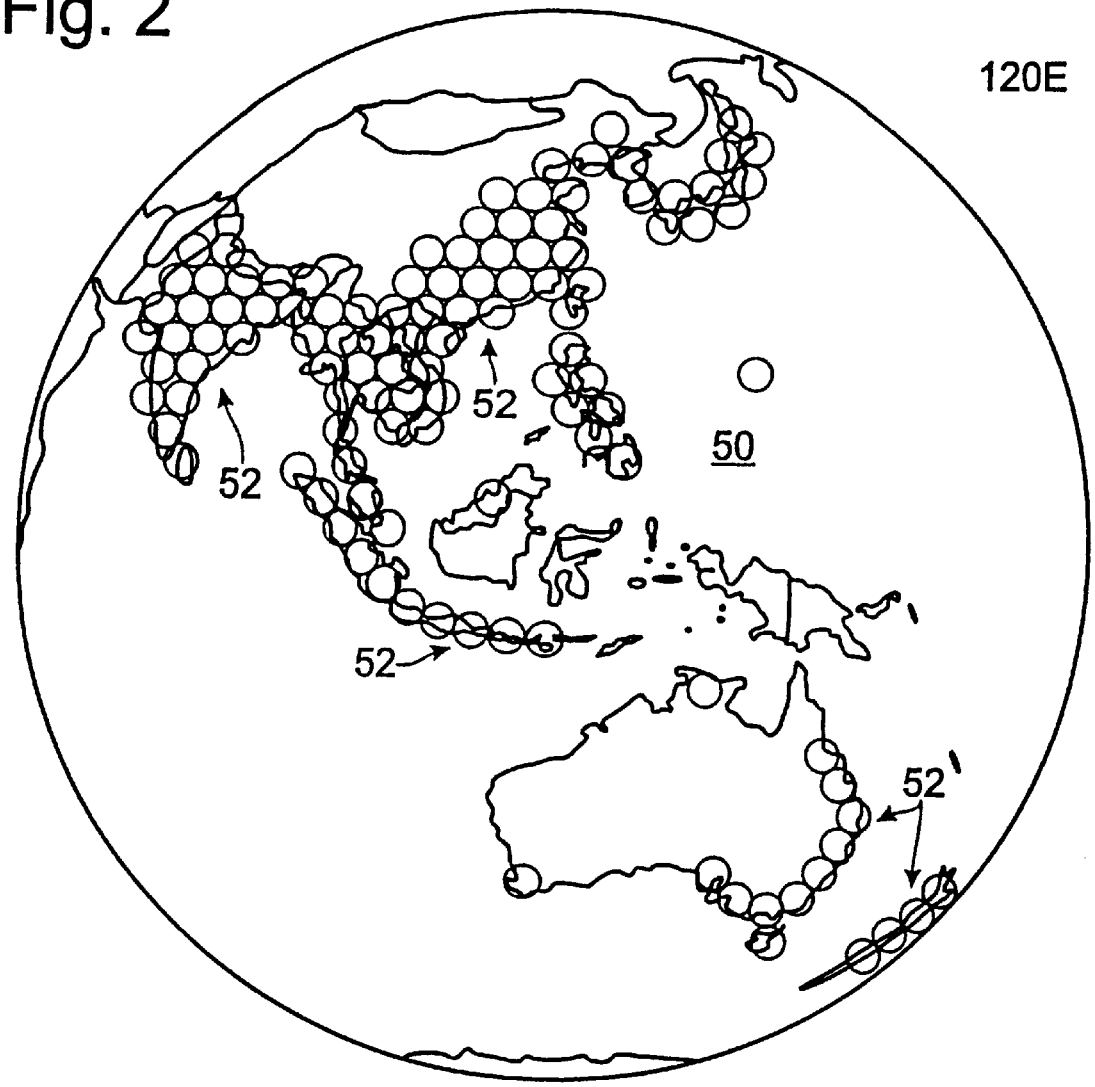
FIG. 2 is an illustration of a satellite telecommunications region having multiple separate downlink cells.

FIG. 2 is an illustration of a satellite telecommunications region 50 having multiple cells 52 (represented by circles) to which narrow zone communication signals are transmitted from a satellite such as a satellite with system 10 in geosynchronous earth orbit. Cells 52 correspond to different geographic areas within region 50. For purposes of illustration, selected ones of cells 52 are considered to suffer periodically from rains that cause significant downlink signal degradation. Different groups of cells 52 receive downlink signals carried on different channels of system 10. In some applications, the downlink signal carried on a single channel could be directed to a single cell 52. It will be appreciated, however, that the geographic region shown in FIG. 2 is merely illustrative and that operation of the present invention is applicable to other geographic regions.

FIG. 3 is a block diagram illustrating a satellite communication system 58 with satellite 11 in communication with exemplary ground-based or terrestrial stations 60–64. A satellite control center 60 transmits and receives satellite control signals for controlling satellite 11 and its operation. A transmitting user station 62 transmits or uplinks a communication signal to satellite 11 to be broadcast or downlinked to a recipient station 64, and typically many other recipient stations as well. Recipient station 64 is located within one of cells 52. In one embodiment, a local hub 66 determines weather conditions within the cell for recipient station 64, either by determinations made at local hub 66 (e.g., monitoring weather radar) or communicated to local hub 66 from recipient station 64 or stations (e.g., via telephone lines, but other communication may be used). Typically, multiple user transmitting stations 62 and local hubs 66 would be included, with stations 62 and 64, hubs 66, and control center 60 located in different cells or regions.

Control center 60 includes or is in communication with a traffic control center (shown included for purposes of illustration) that communicates with transmitting user stations 62 and local hubs 66 to obtain and maintain information about satellite traffic and rain in each cell. Control center 60 also maintains information about the satellite resource configuration. In one implementation, control center 60 may inform a transmitting user station 62 of the code rate to use based on resource (e.g., bandwidth) availability, as described below in greater detail. It will be appreciated, however, that as alternatives to a central control center 60 the satellite and traffic control operations may be distributed among multiple hubs or performed on satellite 11. Control center 60, transmitting station 62, recipient station 64 and local hub 66 may communicate via terrestrial or satellite communication links 68.

Figure 4A:
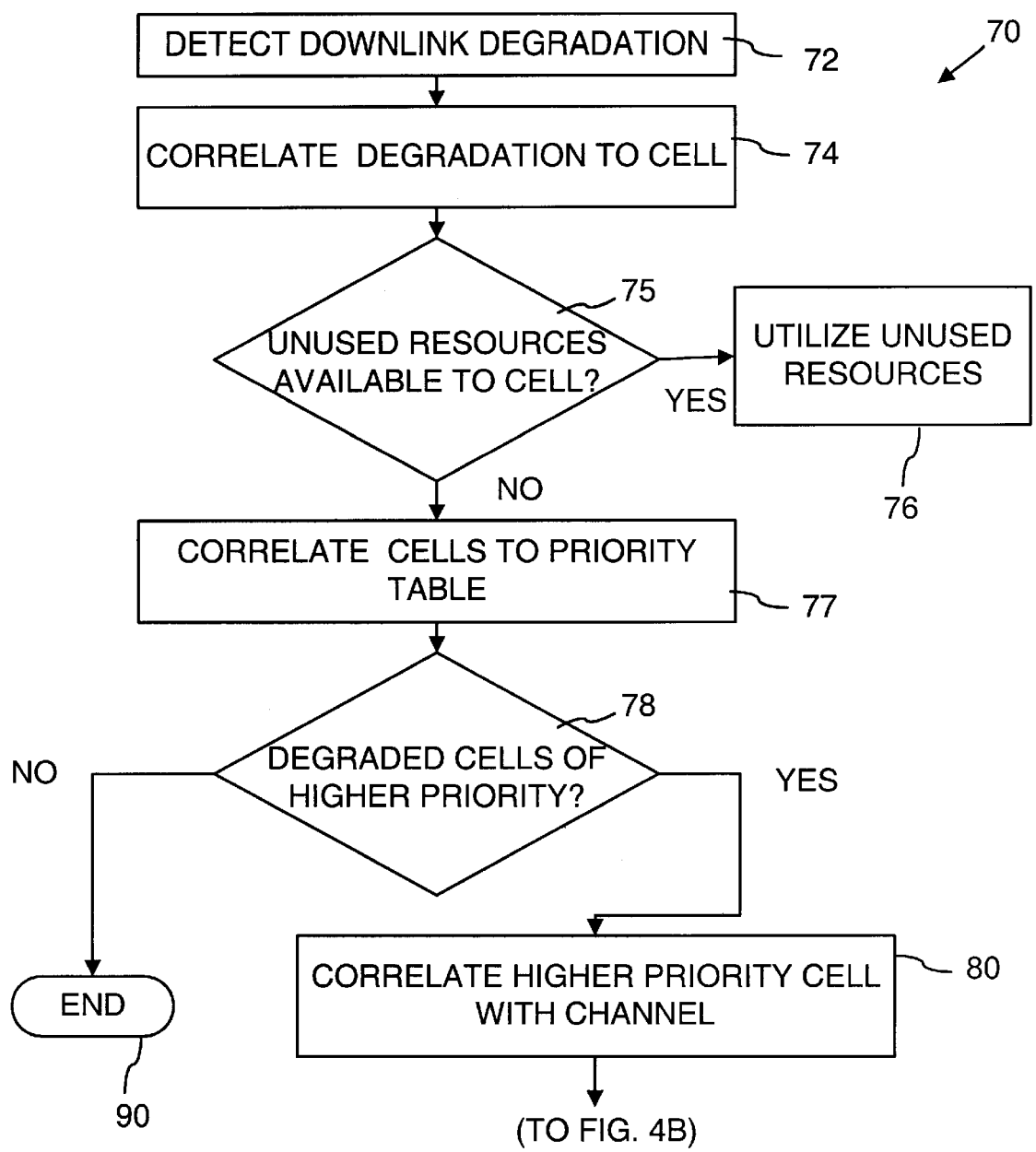
FIGS. 4A and 4B are a flow diagram of a dynamic downlink resource allocation process according to the present invention.
Figure 4B:
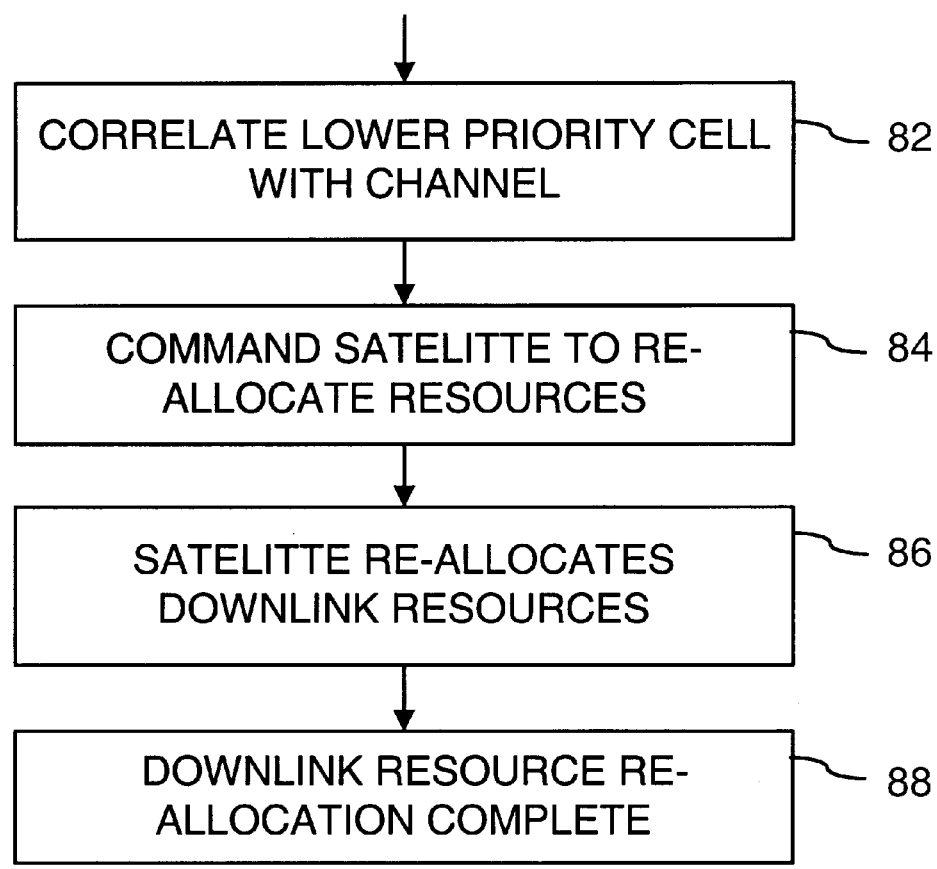

FIGS. 4A and 4B are a flow diagram of a dynamic downlink resource allocation process 70 for dynamically allocating downlink resources between channels in a communication satellite that includes satellite system 10. Process 70 may be utilized to dynamically allocate downlink resources to regions or cells 52 experiencing excessive downlink signal degradation due to rain or other atmospheric conditions or due to excessive traffic or bandwidth demands. The following description is made with reference to compensation for signal degradation caused by rain, but it will be appreciated that process 70 is similarly applicable to degradation resulting from excessive traffic load demands or other causes.

Process block 72 indicates that downlink signal degradation is detected. The downlink signal degradation may be detected in a variety of ways. As one example of ground-based detection of downlink signal degradation, downlink signal degradation could be detected at individual reception stations and the degradation information transmitted by terrestrial channels (e.g., telephone lines) to a terrestrial control center. The downlink signal degradation could also be classified as to whether it exceeds a predetermined maximum level of acceptable degradation before additional processing is performed. The control center would include programmed information processing or computer systems for processing the information. As another example, a control center could identify terrestrial regions experiencing significant rainfall and designate those regions as likely to be experiencing significant downlink signal degradation.

In one implementation a recipient of a transmission (i.e., an end user) may monitor signal strength of a satellite beacon that is transmitted from satellite 11, the bit error rate (BER) of the demodulated beacon signal, sky temperature, etc. When criteria warrants system action, the end user's equipment will contact a local hub (e.g., hub 66), control center station 60, or satellite 11 directly (depending on where the resource allocation decision making is done). The contact may be made automatically by the user's equipment or manually by the user and may be via land line or via the satellite itself.

In another implementation hub 66 monitors the beacon signal strength or resulting demodulated BER, sky temp, weather radar data for the cell, etc. Hub 66 will then assess the resource requirements for its cell and relay this information to control center 60 or satellite 11 (depending on where the resource allocation decision is being made). The relay may be made automatically by hub 66 or manually by a hub operator and may be via land line or the satellite itself. The hub may have equipment capable of assessing cell traffic loads, in which case the hub could directly request additional resource allocation for its cell.

Process block 74 indicates that the downlink signal degradation is correlated with a cell 52. The correlation in this implementation may be made at control center station 60, but could alternatively be made at hubs 66 or on satellite 11 as described below.

In one implementation, control center station 60 maintains information about traffic load in all cells. For example, a transmitting user station 62 contacts control center 60 for a "circuit" assignment (e.g., frequency and bandwidth allocation) to use for transmitting a particular communication signal. Thus such a control center 60 will have information from all cells to assess resource requirements and reallocate resources, if necessary. The manner of contact between the control center and transmitting user may be via land line or via the satellite itself.

In another implementation satellite 11 carries on board remote sensing equipment to measure the rain degradation in each cell. Additional resource information would include power monitors in each transponder to assess the present traffic demand and bandwidth requirements. This information could then be relayed to the control center for resource allocation decision making. Alternatively, the satellite could monitor, assess and reallocate cell resources autonomously.

Query block 75 represents an inquiry as to whether there are unused resources available to the cell 52 experiencing downlink signal degradation. The unused resources may be allocated specifically to the cell 52 or may be available to multiple or all cells. As an example of a specifically allocated resource, the amplifier corresponding to the cell 52 could be operating at below its maximum power level. Whenever there are unused resources available to the cell 52 experiencing downlink signal degradation, query block 75 proceeds to process block 76. Whenever there are no unused resources available to the cell 52 experiencing downlink signal degradation, query block 75 proceeds to process block 77.

Process block 76 indicates that the cell 52 experiencing downlink signal degradation utilizes the available unused resources. For example, an amplifier operating at below its maximum output power level for the cell 52 experiencing downlink signal degradation has its output power level increased.

Process block 77 indicates that the cell 52 experiencing downlink signal degradation are correlated with a table of cell transmission priorities held, for example, at the control center. Each cell is assigned a priority relative to other cells. The priority of a cell 52 relates typical signal traffic, population density, premium service charges, or other factors to determine the relative priority of maintaining downlink signal quality to each cell 52. For example, a cell encompassing a major metropolitan area would typically be assigned a higher priority than a cell directed toward a rural area of relatively low population. The table of cell transmission priorities may be held as a listing or database within the information processing or computer systems at the local hub or control center or, alternatively, on the satellite.

Query block 78 represents an inquiry as to whether the cell 52 experiencing downlink signal degradation are of higher priority than other cells 52. Whenever the cell 52 experiencing downlink degradation are of higher priority than other cells, query block 78 proceeds to process block 80. Whenever the cell 52 experiencing downlink degradation are not of higher priority than other cells, query block 78 proceeds to termination block 90.

Process block 80 indicates that the higher priority cell 52 experiencing downlink signal degradation are correlated at the control center with corresponding channels carried by satellite system 10. The correlation between the cell 52 experiencing downlink signal degradation and the corresponding channels carried by satellite system 10 results in an identification of channels requiring additional resource allocation.

Process block 82 indicates that lower priority cell or cells 52, typically the lowest priority ones, are also correlated at the control center with corresponding channels carried by satellite system 10. The correlation between the lower priority cell or cells 52 and the corresponding channels carried by satellite system 10 results in an identification of channels from which resources are to be allocated for the benefit of the higher priority cell or cells 52.

Process block 84 indicates that satellite 11 is commanded in a control signal transmission to reallocate resources according to the identification of channels requiring additional resource allocation and the channels from which resources are to be allocated.

Process block 86 indicates that satellite 11 re-allocates downlink signal resources. For example, satellite control unit 32 re-allocates downlink signal resources between channels to enhance the downlink resources allocated to the channels requiring additional resource allocation while diminishing resources allocated to the identified lower priority cell or cells 52. Resources are reallocated by first removing them from one or more cells (e.g., reducing the output power of the transponder for the one or more cells) and then applying the resources to another cell (e.g., increasing the output power of the transponder for that cell). In one implementation a low priority cell that needs additional resources will get them only if a higher priority cell has excess. However, cell priority is a dynamic ordering. A high priority cell remains so only by taking full advantage of its assigned resources.

In another implementation, a cell that needs additional resources may be allocated resources according to the following hierarchy: (1) if additional bandwidth is available, the transmitting user can decrease code rate and use the additional bandwidth to maintain throughput or data rate; (2) if no additional bandwidth is available, the transmitting user can decrease code rate (but with a reduction in data rate), or additional power can be allocated to the appropriate cell, or the communication signal could be routed to a different frequency band less susceptible to the rain attenuation or having more bandwidth, as described below in greater detail.

In another implementation, historic data on diurnal and seasonal weather patterns and traffic loads may be used to predict resource requirements. Resources may be reallocated to cells having predicted needs for increased resources (e.g., routing communication signals to a higher-power TWTA or reconfiguring the antenna coverage). Such predicted resource variations may be used alone as the basis for allocating system resources. Alternatively, real time traffic load and rain attenuation information can be used to allocate additional resources in a real time fashion.

Process block 88 indicates that the downlink resource reallocation is complete. As a result, the communication signal is transmitted with additional resources to the reception stations within the cell 52 where downlink signal degradation was detected.

Dynamic resource allocation process 70 utilizes a combination of downlink signal degradation detection, together with cell priorities, to implement satellite-based allocation of downlink transmission resources. Process 70 allows the fixed resources of a satellite to be allocated according to degradation caused by for example, rain, relative to the significance of delivering transmission to a particular region. The determination of downlink signal degradation and the allocation of power between channels or cells may be implemented in a number of ways.

Figure 5:
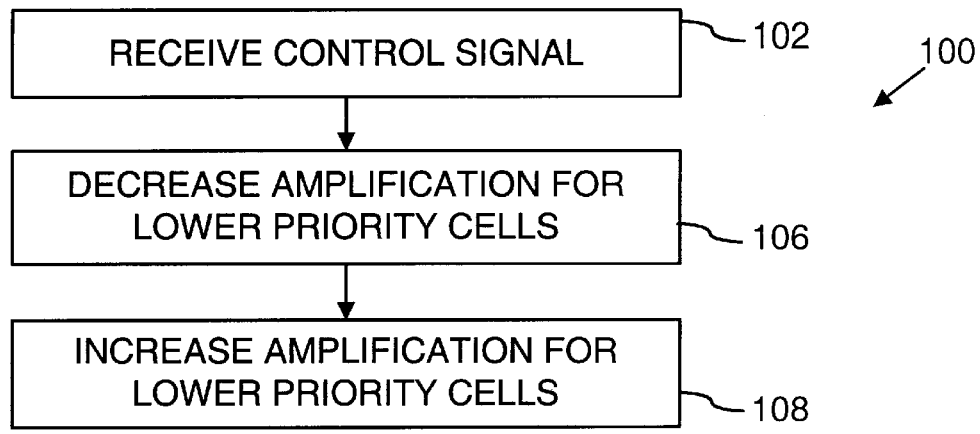
FIG. 5 is a flow diagram of a downlink power allocation process utilized in an embodiment of the process of FIGS. 4A and 4B.

FIG. 5 is a flow diagram of a power allocation process 100 utilized on a satellite incorporating satellite system 10. Process 100 functions to increase the downlink signal strength independent of uplink signal strength via transponder or antenna gain. In contrast, U.S. Pat. No. 4,831,619 increases the uplink signal strength and thus the downlink signal strength, which is relatively ineffective when the transponder is saturated. Process 100 would be one implementation of the re-allocation of downlink signal resources referenced in process block 86.

Process block 102 indicates that the satellite receives the control signal transmitted according to process block 84.

Process block 106 indicates that control unit 32 decreases amplification of driver amplifiers in high power amplifier system 22 carrying communication signals corresponding to lower priority cells. It will be appreciated that the decrease in the amplification could be incremental or could include completely eliminating amplification and transmission of a downlink signal to the lower priority cells, thereby reducing the number of channels carried by system 10.

To increase amplifier power if traveling wave tube amplifier (TWTA) 23 is operating in a backed-off configuration, the driver gain can be increased thus increasing the output power level of TWTA 23. To increase amplifier power if TWTA 23 is operating in a saturated configuration, TWTA 23 may have more multiple output power levels at which it can operate and thus can be commanded to operated at a higher or lower output power as required. In another implementation, high and low power TWTAs 23 may be selectively assigned to different regions or cells to achieve the power allocations. A benefit of this implementation is that for some amplifiers operation at a power level below full power is less efficient than a lower-powered amplifier operating at full capacity. Hence, selections between high and low power TWTAs 23 can provide more efficient operation than low power use of higher powered TWTAs. With reference to FIG. 1, selections between power levels of a TWTA 23 or TWTAs 23 of different power may be controlled by a payload configuration control 107 (FIG. 1) in communication with control unit 32.

Process block 108 indicates that control unit 32 increases amplification of driver amplifiers in high power amplifier system 22 carrying communication signals corresponding to higher priority cells.

Figure 6A:
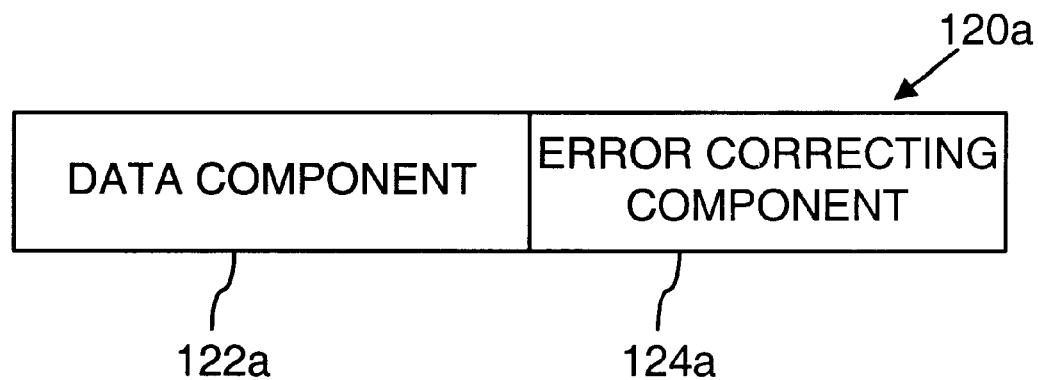
FIGS. 6A and 6B schematically illustrate downlink signals with different relative data components and error correcting components.

Another example of a downlink resource that can be re-allocated according to resource allocation process 70 to compensate for downlink signal degradation in higher priority cells is the data code rates utilized for different cells. Downlink signals may be transmitted at selected frequencies in a digital data format that includes a data component and an error correcting component. FIG. 6A schematically illustrates a digital data format 120a with a data component 122a and an error correcting component 124a. (The relative portions of components 124a and 124b are exaggerated for illustration.) The error correcting component 124a is determined from the data component 122a and assures that errors in the transmission of the data component 122a are identified and corrected, as is known in the art.

Figure 6B:
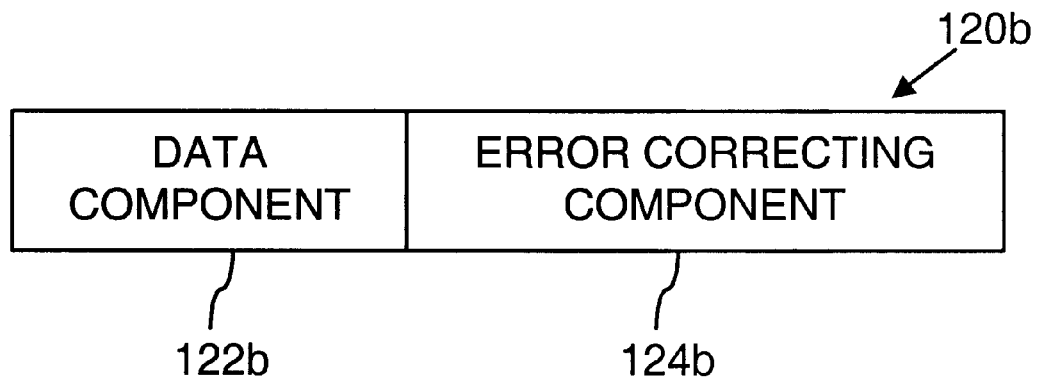

The typical error correcting component 124a makes up a predetermined fraction of the entire digital data format 120a to provide error correction capabilities suitable for normal transmission conditions. With excessive downlink signal degradation caused by localized rain, for example, the typical error correcting component 124a is inadequate to correct the larger numbers of transmission errors that occur. The typical result is downlink signal degradation. In accordance with the present invention, however, an increased fraction of downlink signal allocated to the error correcting component of the downlink signal can compensate for excessive downlink signal degradation. FIG. 6B schematically illustrates a downlink signal 120b with an enhanced error correcting component 124b and a corresponding data component 122b.

The code rate (R) is defined by $R=k/n$ and can be interpreted as the number of information bits per transmitted bits, where k is the number of information bits 122, and n is the total number of bits transmitted (i.e., the sum of bits 122 and 124). Error correction coding results in overhead, thus $n>k$ and $R<1$. By decreasing the code rate, more bits are needed to transmit the same amount of information, but the transmission is more robust to signal degradation. To get the same information throughput, bandwidth must increase as coding rate decreases.

Figure 7:
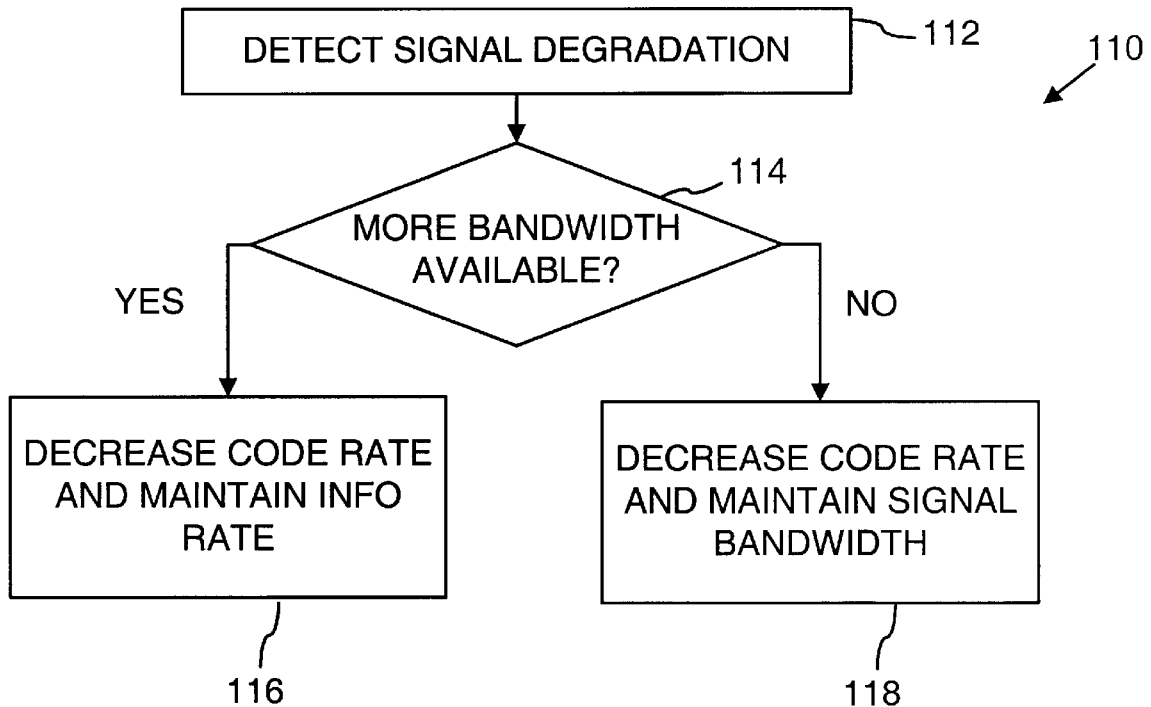
FIG. 7 is a flow diagram illustrating a code rate allocation process that may be utilized in the dynamic downlink resource allocation process of FIGS. 4A and 4B.

FIG. 7 is a flow diagram illustrating a code rate allocation process 110 that may be utilized in dynamic downlink resource allocation process 70 of FIGS. 4A and 4B.

Process block 112 indicates that signal degradation is detected as discussed, for example, in process block 72.

Query block 114 represents an inquiry as to whether additional communication signal bandwidth is available. Whenever additional signal bandwidth is available, query block 114 proceeds to process block 116. Whenever additional signal bandwidth is not available, query block 114 proceeds to process block 118. Availability of additional bandwidth may represent bandwidth that is currently not used or an allocation of bandwidth between users in which bandwidth initially assigned to a lower priority user is reallocated to a higher priority user.

Process block 116 indicates that the transmitting user is instructed to decrease the uplink or transmitting code rate and to maintain the information transmission rate. This results in an increase in the bandwidth allocated to and used by the transmitting user. The instruction to a transmitting user may be sent from control center 60 or satellite 11 or local hub 66 according to where resource allocation determinations are made.

Process block 118 indicates that the transmitting user is instructed to decrease the uplink or transmitting code rate and to maintain the communication signal bandwidth. This results in a decrease in the information transmission rate. The instruction to a transmitting user may be sent from control center 60 or satellite 11 or local hub 66 according to where resource allocation determinations are made. For both process blocks 116 and 118, decreasing the code rate results in a more robust transmission of information.

Another example of a downlink resource that can be re-allocated to compensate for downlink signal degradation in higher priority cells is downlink signal frequency assignment. Many communications satellites include multiple frequency bands of operation. For example, some satellite communication systems support both Ku-band (e.g., 14/12 GHz) communication and lower frequency C-band (e.g., 6/4 GHz) communication by including parallel Ku-band and C-band repeater components. It will be appreciated, however, that references to C- and Ku-band frequencies are illustrative and that this invention is similarly applicable to other frequency bands.

Since rain-induced degradation of downlink signals is most problematic for Ku-band and higher frequency communications, C-band downlink resources can be used in substitution for rain attenuated Ku-band downlink signals. (Ku-band is preferred over C-band in many communication applications because of the significantly greater bandwidth available in the former.) Conversely, degradation due to traffic load would typically be more problematic for lower frequency communications than for higher frequency communications due to the frequency-related bandwidth differences. Whenever a lower frequency downlink resource is degraded because of traffic load, higher frequency resources can be used in substitution. The following description is made with reference to rain-induced degradation, but is similarly applicable to traffic load-induced degradation.

Figure 8:
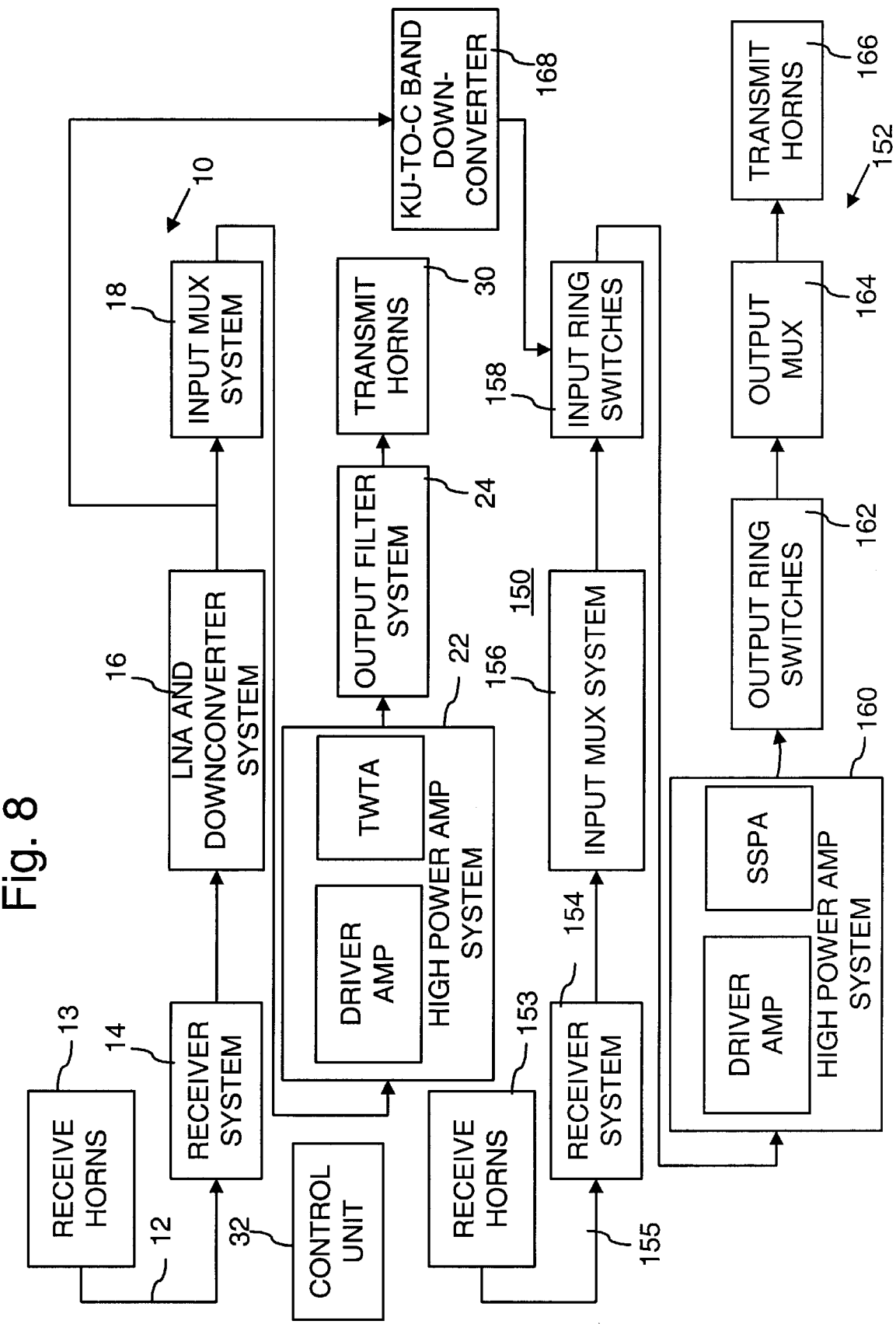
FIG. 8 is a block diagram of an exemplary dual-band communication satellite system for illustrating a downlink resource allocation system of the present invention.

To use such frequency assignment allocation, system 10 would be modified from its generally conventional design. FIG. 8 is a block diagram of an exemplary dual-band satellite communication system 150 utilizing dynamic communication signal frequency allocation according to the present invention. Satellite system 150 includes Ku-band system 10 together with a generally conventional C-band system 152.

C-band system 152 includes a broadband receiver 154 that receives C-band uplink signals from a receiving antenna or horn 153 at an input 155 and passes them to an input multiplexer 156 that separates the communication signals into channels. The channelized signals are delivered to input ring switches 158 and then to a set of high power amplifiers, preferably solid state power amplifiers (SSPA) 160. Amplified signals from SSPAs 160 are routed to output ring switches 162 and then to an output multiplexer 164 that recombines the channelized signals and delivers them to a transmit horn or horns 166 for transmitting the downlink signals.

Satellite system 150 also includes a Ku-to-C band downconverter 168 coupled between the output of LNA and downconverter system 16 of system 10 and the input of input ring switches 158 by appropriate coupling switches. Downconverter 168 functions to frequency downconvert Ku-band signals to C-band downlink signals while also delivering downconverted Ku-band signals to C-band system 152. Downconverter 168 may be engaged to use C-band downlink resources in substitution for rain attenuated Ku-band downlink signals. It will be appreciated that this substitution of a former Ku-band signal on a C-band channel or channels will disrupt transmission of the corresponding original C-band signals. Such a disruption may be made according to the relative priorities of the original Ku-band and C-band communications.

While much of the preceding description has been directed to downlink signal degradation caused by rain at a downlink receiving station, it will be appreciated that the present invention is similarly applicable to downlink signal degradation resulting from other causes. For example, the present invention may be used in response to signal degradation caused by excessive traffic or bandwidth demand within a region or cell. Whereas signal degradation caused by rain is characteristic of Ku-band and higher frequency operations, signal degradation caused by traffic or bandwidth can occur at any frequencies. Accordingly, downlink resource allocation in response to excessive traffic or bandwidth demand is applicable across all communication satellite downlink frequencies.

Resource allocation process 70 of FIG. 4A for dynamically allocating downlink resources is described with reference to a terrestrial control center that obtains downlink signal degradation information and correlates the information with a cell transmission priority table. It will be appreciated that the programmed information processing or computer systems described as being at the control center could alternatively be carried on the satellite with either of systems 10 or 150.

In one embodiment, downlink signal strength is monitored at an earth based downlink receiver. When the downlink signal experiences degradation an uplink signal from that cell communicates the signal condition directly to the satellite, which then makes the appropriate resource allocation to compensate for the signal degradation. In other embodiments, the satellite may include sensors for detecting weather conditions on earth and allocates downlink resources according to detected conditions, or information may be stored at the satellite and the satellite processes the information to compensate for predicted signal degradation.

Downlink resource allocation processes described above, including power allocation process 100 and code rate allocation process 130, are similarly applicable to satellites utilizing such region-wide downlink transmission patterns. The antenna pattern servicing a large region can be dynamically shaped to provide more radiated power over rainy or high traffic parts of the region utilizing a configurable phased array, mechanical deformation of reflector, "tunable" feed network, etc.

In an implementation described above, historic data on diurnal and seasonal weather patterns and traffic loads may be used to predict resource requirements. Resources may be reallocated to cells having predicted needs for increased resources. Such predicted resource variations may be used alone as the basis for allocating system resources. Alternatively, real time traffic load and rain attenuation information can be used to allocate additional resources in a real time fashion.

Figure 9:
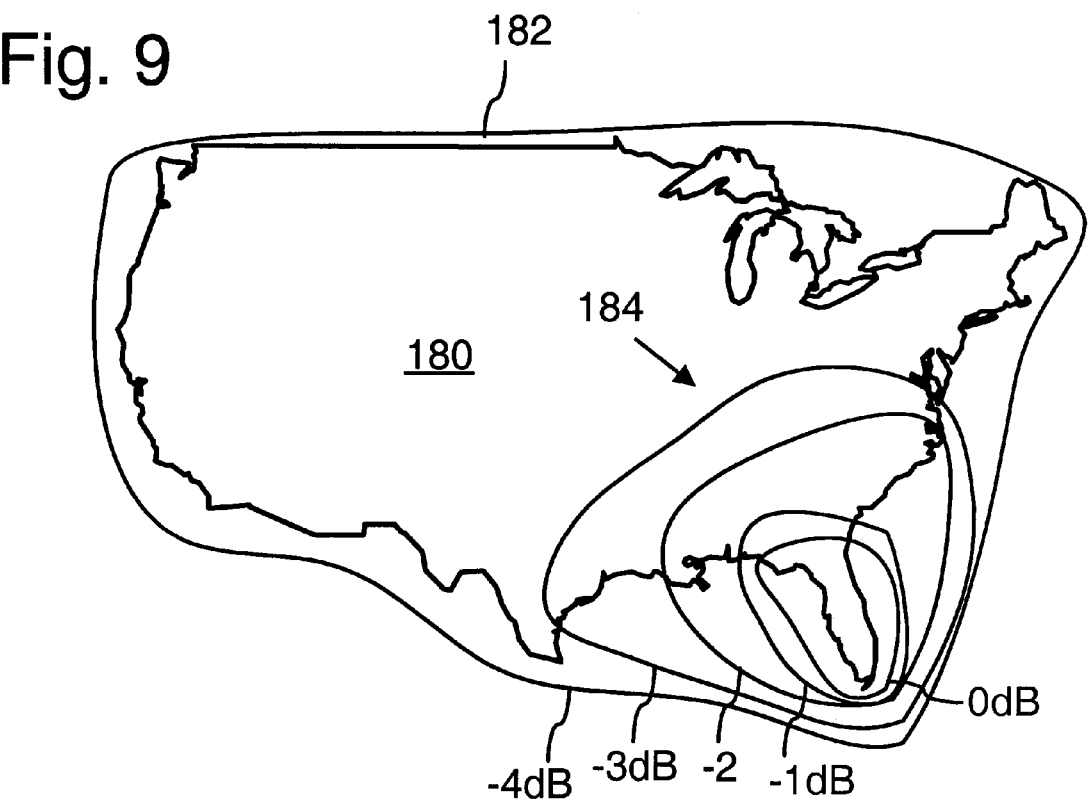
FIGS. 9 and 10 are illustrations of a satellite telecommunications region having respective first and second region-wide downlink transmission patterns according to seasonal rain patterns.
Figure 10:
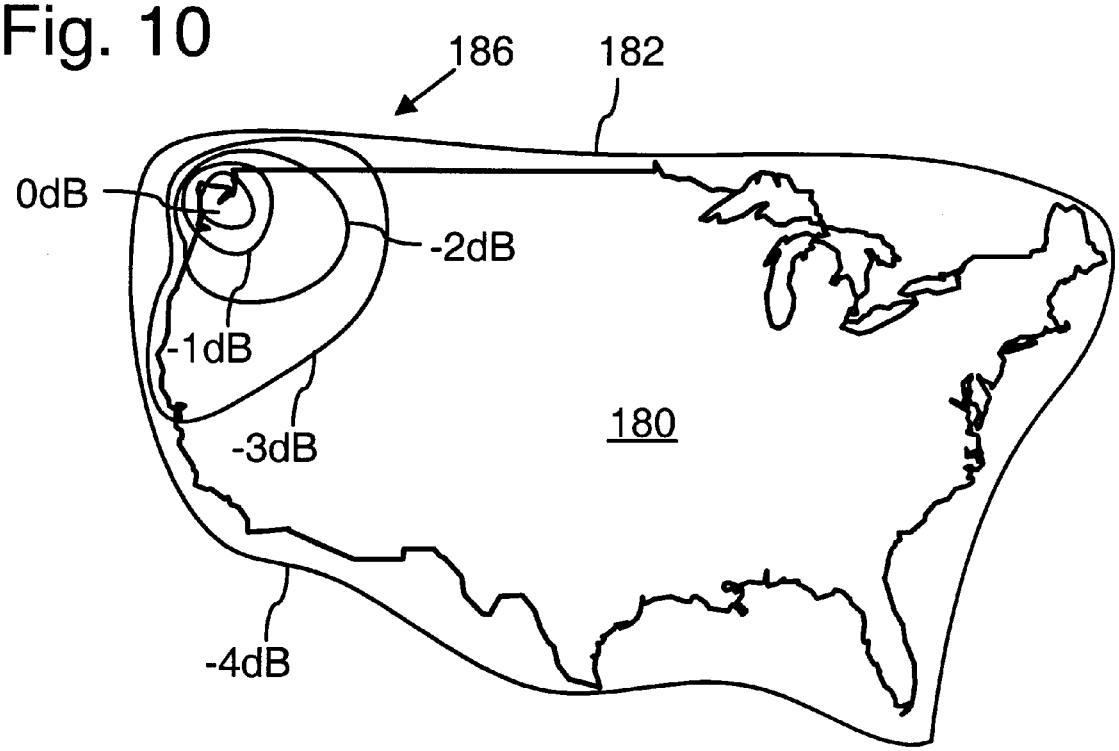

FIGS. 9 and 10 illustrate an example in which power allocations between regions are made based upon seasonal weather patterns. FIG. 9 illustrates a satellite telecommunications region 180 having a contiguous region-wide broadcast area 182 within which downlink power contours show localized regions 184 (e.g., SE. USA) to which increased downlink power is directed. Such an exemplary power allocation could be made to compensate for seasonal rains that occur regularly during summer months. FIG. 10 illustrates satellite telecommunications region 180 having contiguous region-wide broadcast area 182 within which downlink power contours show localized regions 186 (e.g., NW. USA) to which increased downlink power is directed. Such a power allocation could be made to compensate for seasonal rains that occur regularly during winter months. Power can be allocated to the group of transponders servicing a region undergoing rain fade or increased traffic load. Resources would come from the group of transponders servicing a region having excess resources.

Figure 11:
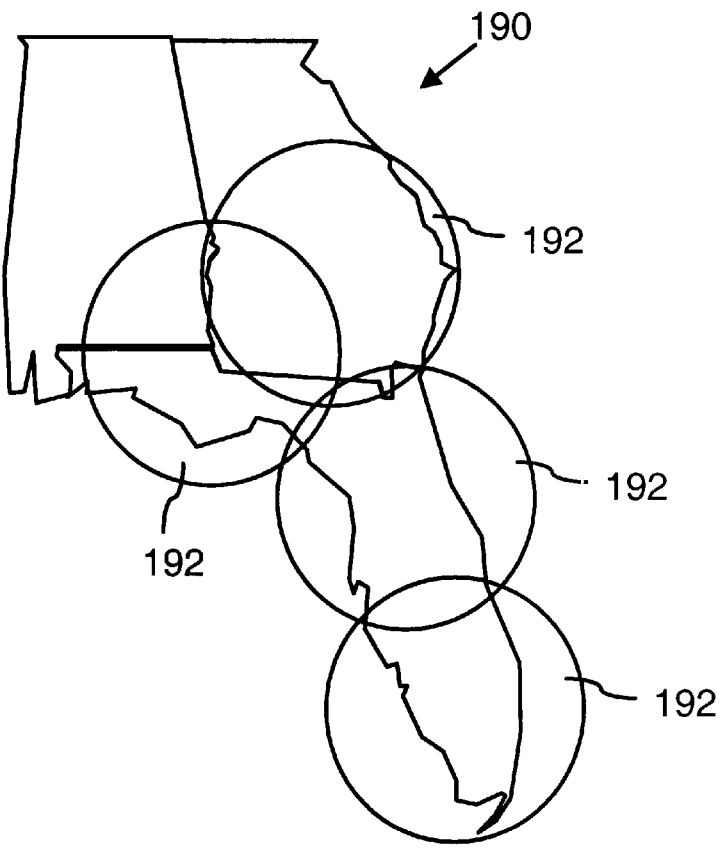
FIGS. 11 and 12 are illustrations of a satellite telecommunications region showing a cell divided into multiple cells to provide a downlink resource allocation.
Figure 12:
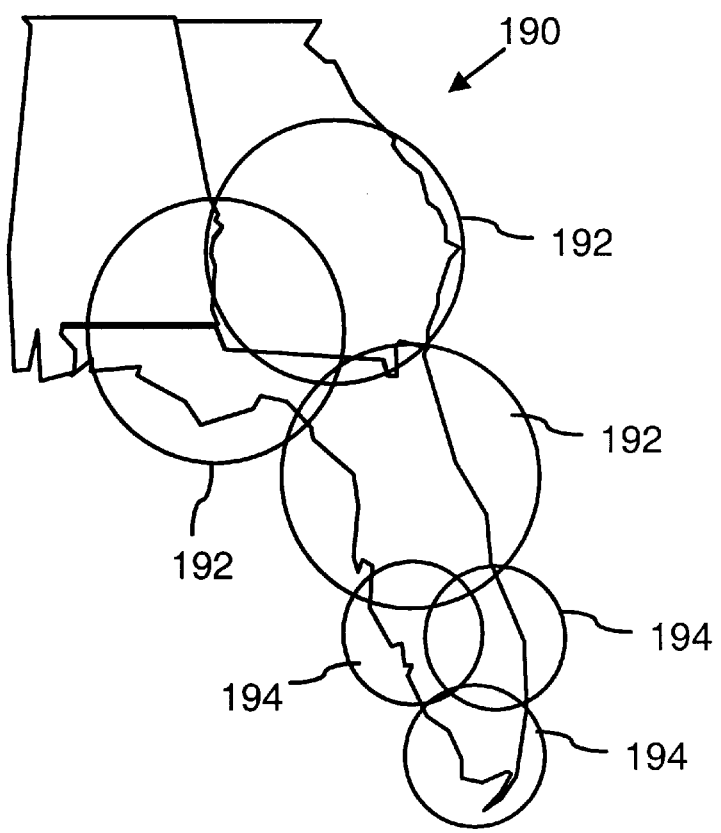

Another form of resource allocation may be dividing a cell into multiple cells in order to increase effective bandwidth and signal strength within selected ones of the cells. FIG. 11 is an illustration of a satellite telecommunications region 190 having exemplary cells 192 (represented by circles). FIG. 12 is an illustration of region 190 in which one of cells 192 of FIG. 11 is divided into multiple cells 194. If several localized cells have excess resources, they can be combined into a larger cell thus reducing their bandwidth and power allocations (which therefore can be reallocated). Such a cell-division manner of resource allocation may be based upon diurnal and seasonal weather patterns, regular traffic loads, or degradations due to real-time rain or traffic load, as described above.

Variations in the antenna patterns or configurations servicing a region as shown in FIGS. 9–12 can be dynamically shaped to divide cells or to provide more radiated power over rainy or high traffic parts of the region. With reference to FIG. 1, these variations may be made as is known in the art by utilizing a configurable phased array, mechanical deformation of reflector, "tunable" feed network, etc., that are controlled by an antenna configuration control 198 (FIG. 1) in communication with control unit 32.

In view of the many possible embodiments to which the principles of our invention may be applied, it should be recognized that the detailed embodiments are illustrative only and should not be taken as limiting the scope of our invention. For example, while the embodiments described are directed primarily to degradation in downlink communication signals, the present invention is similarly applicable to other types of downlink signals (e.g., control signals). Accordingly, the invention includes all such embodiments as may come within the scope and spirit of the following claims and equivalents thereto.

What is claimed is:

1. In a communication satellite system having a satellite in earth orbit with at least one uplink from a first region and plural downlinks to recipient stations in plural regions other than the first region, the downlinks to the plural regions utilizing plural downlink signal resources on the satellite, a dynamic downlink resource allocation method for allocating downlink resources between the regions, comprising:

detecting a degraded downlink signal that is directed to at least one of the regions other than the first region; and allocating additional downlink signal resources on the satellite to the degraded downlink signal and from selected other downlink signals.

2. The method of claim 1 in which the downlinks carry broadcast signals to multiple stations within the plural regions.

3. The method of claim 1 further comprising establishing a priority table listing relative priorities of the plural regions, correlating the one or more regions to which the degraded downlink signal is directed with the priority table, determining whether allocation of additional downlink signal resources to the degraded downlink signal would adversely affect higher priority regions, and allocating additional downlink resources on the satellite to the degraded downlink signal whenever the region to which the signal corresponds would not adversely affect higher priority regions.

4. The method of claim 3 in which the priority table includes a priority criterion relating to population density.

5. The method of claim 3 in which the priority table includes a priority criterion relating to communication load.

6. The method of claim 3 in which the priority table includes a priority criterion relating to premium service charges.

7. The method of claim 1 in which the allocation of additional downlink signal resources on the satellite to the degraded downlink signal includes allocating additional amplification resources on the satellite to the degraded downlink signal.

8. The method of claim 7 in which the allocation of additional downlink signal resources on the satellite to the degraded downlink signal includes withdrawing amplification resources on the satellite from selected regions other than the at least one region to which the degraded downlink signal is directed.

9. The method of claim 7 in which the satellite includes lower- and higher-powered amplifiers and the allocation of additional downlink signal resources on the satellite to the degraded downlink signal includes switching between lower- and higher-powered amplifiers on the satellite.

10. The method of claim 1 in which the allocation of additional downlink signal resources on the satellite to the degraded downlink signal includes allocating additional bandwidth resources on the satellite to the degraded downlink signal.

11. The method of claim 10 in which the allocation of additional downlink signal resources on the satellite to the degraded downlink signal includes withdrawing bandwidth resources on the satellite from a selected region other than the at least one region to which the degraded downlink signal is directed.

12. The method of claim 1 in which the degraded downlink signal is carried in a first downlink frequency band and the allocation of additional downlink signal resources on the satellite to the degraded downlink signal includes allocating a second downlink frequency band to the degraded downlink signal.

13. The method of claim 12 in which second downlink frequency band is of a lower frequency than the first downlink frequency band.

14. The method of claim 12 in which second downlink frequency band is of a higher frequency band than the first downlink frequency band.

15. The method of claim 1 in which the allocation of additional downlink resources is independent of the allocation of resources in the uplink.

16. The method of claim 1 in which the downlink signal degradation is rain-induced downlink signal degradation.

17. The method of claim 1 in which the downlink signal degradation is communication load-induced downlink signal degradation.

18. The method of claim 1 in which additional downlink signal resources on the satellite are allocated to the degraded downlink signal only if it has more than a predetermined threshold signal degradation.

19. The method of claim 1 in which the satellite includes a downlink antenna with a downlink antenna configuration and the allocation of additional downlink signal resources on the satellite to the degraded downlink signal includes altering the downlink antenna configuration.

20. The method of claim 1 in which the degraded downlink signal is a communication downlink signal.

21. In a satellite communication system having a satellite in earth orbit with at least one uplink from a first region and plural downlinks to recipient stations in plural regions other than the first region, the downlinks to the plural regions utilizing plural downlink signal resources on the satellite, a dynamic downlink resource allocation system for allocating downlink resources between the regions, comprising:

detection means for detecting a degraded downlink signal that is directed to at least one of the regions other than the first region; and allocation means for allocating additional downlink signal resources on the satellite to the degraded downlink signal independent of uplink signal power.

22. The system of claim 21 in which the detection means is on-board the satellite.

23. The system of claim 21 in which the allocation means is on-board the satellite.

24. The system of claim 23 in which the allocation means includes variable gain amplifiers for selectively allocating downlink transmission power to the degraded downlink signal.

25. The system of claim 23 in which the satellite communication system operates within a pair of frequency bands, a first band being at a frequency of about the Ku-band or a higher frequency and a second band being at a frequency lower than the Ku-band, and the allocation means includes frequency allocation means for allocating downlink signals in the second band to uplink signals in the first band.

26. The system of claim 21 in which the allocation means includes a priority table listing relative priorities of the plural regions and means for allocating additional downlink signal resources on the satellite to the degraded downlink signal whenever the region to which the signal corresponds would not adversely affect higher priority regions.

27. The system of claim 21 in which the allocation means includes means for selectively allocating code rate capacity to the degraded downlink signal and from selected other downlink signals.

28. In a communication satellite system having a satellite in earth orbit with at least one uplink and plural downlinks to plural regions, the downlinks to the plural regions utilizing plural downlink signal resources on the satellite, a dynamic downlink resource allocation method for allocating downlink resources between the regions, comprising:

predicting from precipitation patterns a degraded downlink signal that is directed to at least one of the regions; and allocating on the satellite additional downlink signal resources to the downlink signal predicted to be degraded and from selected other downlink signals.

29. The method of claim 28 in which a prediction of a degraded downlink signal is based upon seasonal rain patterns.

30. The method of claim 28 in which a prediction of a degraded downlink signal is based upon diurnal rain patterns.

31. The method of claim 28 further comprising:

detecting a degraded downlink signal that is directed to at least one of the regions; and allocating on the satellite additional downlink signal resources to the downlink signal detected to be degraded and from selected other downlink signals.

* * * * *